United States Patent [19]

Ishida

[11] Patent Number: 4,470,671
[45] Date of Patent: Sep. 11, 1984

[54] RAPID-FOCUS BINOCULAR

[75] Inventor: Tsuneo Ishida, Tokyo, Japan

[73] Assignee: Otsuka Kogaku Kabushiki Kaisha, Tokyo, Japan

[21] Appl. No.: 385,875

[22] Filed: Jun. 7, 1982

[51] Int. Cl.³ .............................................. G02B 23/00
[52] U.S. Cl. ................................................... 350/552
[58] Field of Search ......................................... 350/552

[56] References Cited

U.S. PATENT DOCUMENTS 3,540,792 11/1970 Akin, Jr. .............................. 350/552
4,066,329 1/1978 Van Exel ............................ 350/552

FOREIGN PATENT DOCUMENTS 2035596 6/1980 United Kingdom ................ 350/552

Primary Examiner—John K. Corbin
Assistant Examiner—Lynn Vandenburgh
Attorney, Agent, or Firm—Birch, Stewart, Kolasch & Birch

[57] ABSTRACT

A binocular with a multiple-helicoid focus-adjusting mechanism, in which the internal helicoid is integrally mounted on an ocular-lens bridge member and in mesh with the external helicoid provided in the rear portion of a center shaft. The center shaft is coaxially supported in an objective-lens hinge member and integrally connected through the intermediary of a connecting pin to a knob, which is rotatably mounted on the hinge member. By the help of the multiple-helicoid mechanism, the ocular-lens bridge member is smoothly moved and steadily supported, and the most protrusible position of the ocular-lenses is easy to be adjusted without an addition such as a washer.

4 Claims, 3 Drawing Figures

RAPID-FOCUS BINOCULAR

BACKGROUND AND SUMMARY OF THE INVENTION

The present invention relates to so-called rapid-focus binoculars in which a knob rotation of less than 45 degrees is sufficient to displace the ocular-lenses through a full focusing range, and more particularly to a focus-adjusting mechanism for reciprocating an ocular-lens bridge member with respect to an objective-lens hinge member upon turning of the knob.

A rapid-focus binocular has been disclosed in U.S. Pat. No. 4,066,329 that has a hollow hinge pin fixedly supported on front and rear brackets of both objective-lens housings, a bridge pin axially movably inserted in the hinge pin for supporting both ocular-lens housings, a knob rotatably mounted on the hinge pin, and a focus-adjusting mechanism for working interconnection between the bridge pin and the knob. The mechanism has a cam-slot provided in the knob, an axial guide slot formed in the hinge pin, and a cam-pin projecting radially from the bridge pin through the guide slot into the cam-slot. The cam-slot slopes so steeply with respect to the rotational axis of the knob as to effect a full-range movement of the bridge pin by a short rotational stroke of the knob.

The mechanism as described above has disadvantages, one of which is that a backlash between the cam-slot and the cam-pin can not be so diminished that the ocular-lens housings are smoothly moved without shaking. The steepness of the cam-slot permits the ocular-lens bridge member to easily move even if a single thrust acts on the ocular-lens housings. This leads to another disadvantage that a focus, once adjusted, is easily upset when the eyepiece is touched to user's face. A further disadvantage is that the mechanism cannot lengthen the optical distance between ocular and objective lenses in accordance with tolerance in each finished binocular without providing an additional insertion of a washer or the like on the bridge pin. The rapid-focus binocular is usually arranged to have a full length of ocular movement longer by 0.5 mm to 1 mm than a necessary length, so that it is needed to modify the outermost position of the ocular-lens housings if the optical distance between the ocular and objective lenses is to be lengthened more than 1 mm from a predetermined one due to tolerance of optical elements such as lenses and prisms in finished binoculars. For example, in the case of 7-power binocular with 50 mm diameter objective lenses, the distance tolerably deviates within a range of +1.3 mm to −2.6 mm from the predetermined one under Japanese Industrial Standard. Accordingly, it is unexceptional to modify the outermost position of the ocular-lens housings relative to the objective-lens housings. It is not only difficult but also awkward to attach a washer on the bridge pin for elongation of the optical distance between ocular and objective lenses in finished binoculars.

It is the primary object of the invention to provide a rapid-focus binocular free from the disadvantages as described above.

The binocular of the invention comprises a hollow hinge pin centrally disposed between front and rear brackets of both objective-lens housings, a peripheral guide slot provided in the hinge pin, a center shaft rotatably fitted in the hinge pin, a knob rotatably mounted on the hinge pin, a connecting pin provided between the knob and the center shaft through the guide slot, an internal multiple helicoid provided in the cylindrical portion of the center shaft for engagement with an external multiple helicoid formed on a bridge pin which is centrally disposed between both ocular-lens housings for integral connection thereof. The internal helicoid is rotated to reciprocate the external helicoid upon turning of the knob. The multiple helicoid mechanism is substantially free from backlash and arranged to provide a smooth ocular movement through a full focusing range with a knob rotation of less than 45 degrees. The internal helicoid is angularly adjustable with respect to the axis of the center shaft and long enough to modify an optical distance between the ocular and objective lenses, if needed.

Other and further objects, features and advantages of the invention appear more fully from the following description.

BRIEF DESCRIPTION OF THE DRAWINGS

One way of carrying out the invention is described in detail below with reference to drawings which illustrate only one specific embodiment, in which.

DETAILED DESCRIPTION OF A PREFERRED EMBODIMENT

Figure 1:
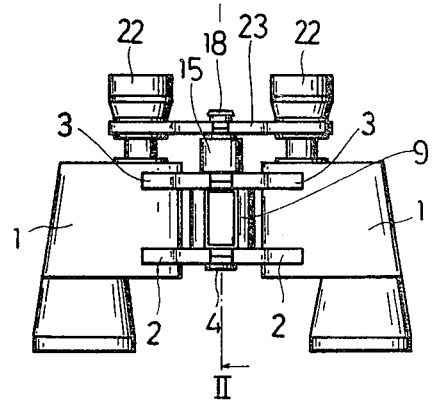
FIG. 1 is a plan view of the binocular according to the invention.

A rapid-focus binocular is shown in FIG. 1, and is of generally conventional construction except for the focus-adjusting mechanism described in detail below. The binocular includes a pair of objective-lens housings 1 with the respective front and rear brackets 2, 3, which are centrally connected with the intervention of a hinge pin 4 for rotation relative to each other. Both ocular-lens housings 22 are provided with the respective brackets 23, which are centrally connected through the intermediary of a bridge pin 18 for rotation relative to each other. The bridge pin 18 has the front portion thereof inserted in the cylindrical portion 15 of a center shaft for axial reciprocation relative thereto. A knob 9 is mounted on the hinge pin 4 and internally connected to the center shaft for integral rotation therewith. As knob 9 makes about one-eighth turn, bridge pin 18 together with ocular-lens housings 22 moves back and forth through a full focusing range relative to objective-lens housings 1.

Figure 2:
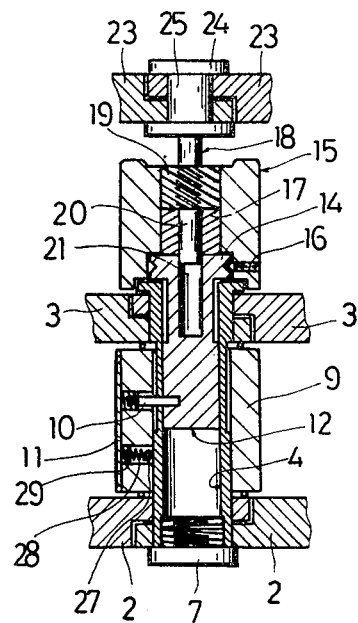
FIG. 2 is a section taken along the line II—II of FIG. 1.
Figure 3:
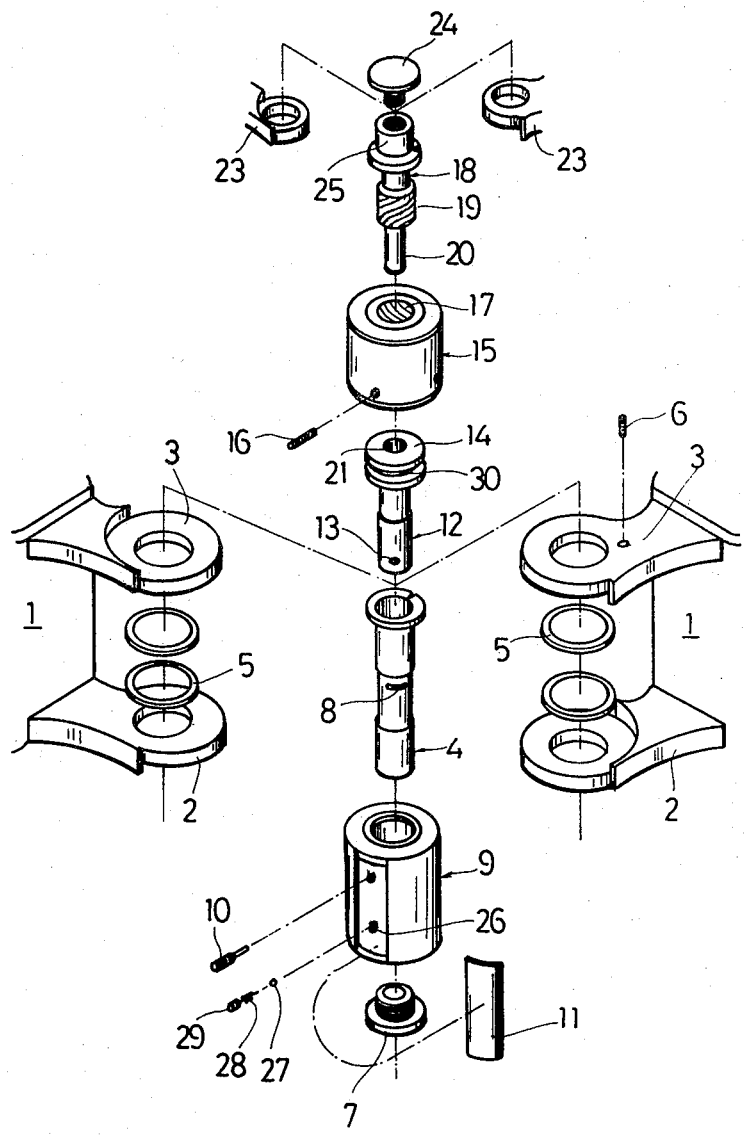
FIG. 3 is a perspective view illustrating exploded parts of the binocular of FIG. 1.

As seen in FIGS. 2 and 3, the hollow and generally cylindrical hinge pin 4 is secured to front and rear brackets 2, 3 with the intervention of a thread 6 and a front cap 7. Hinge pin 4 is formed in the middle of the periphery thereof with a guide slot 8, which extends along a circle perpendicular to the axis of the hinge pin 4 to form an arc with a center angle of less than 45 degrees. The knob 9 is rotatably mounted on hinge pin 4 between front and rear brackets 2, 3 with the intervention of smooth washers 5. A connecting pin 10 has the top portion thereof threadedly secured to knob 9 and the bottom portion inserted into a radial bore 13 in a center shaft 12 through guide slot 8 in hinge pin 4. The center shaft 12 has a flange 14 projected from hinge pin 4 and connected to the cylindrical portion 15, which is separately formed from center shaft 12. The cylindrical portion 15 is secured to flange 14 by the help of a plurality of screws 16, which are threaded from the periphery of the cylindrical portion into the peripheral groove 30 in flange 14, resulting in that cylindrical portion 15 is angularly adjustable with respect to the axis of center shaft 12.

The cylindrical portion 15 is internally formed with an internal multiple helicoid 17 in mesh with an external multiple helicoid 19 formed on bridge pin 18. The bridge pin 18 has the front pivot 20 slidably inserted and axially guided in a center bore 21 in center shaft 12. Both brackets 23 of the respective ocular-lens housings 22 are rotatably fitted on the rear pivot 25 of bridge pin 18 and retained by a rear cap 24, which is threadedly attached to the endmost of bridge pin 18. The multiple-helicoids 17, 19 have such a spiral lead that moves the external helicoid 19 back and forth a distance somewhat longer than that required for focus-adjustment while the knob 9 integral with the internal helicoid 17 is fully turned within guide slot 8. For example, in the case of 7-power binocular with 50 mm objective-lens diameter, the moving length of at most 5 mm is given relative to the full focusing range of 4 mm for compensation of tolerance of the optical distance between the ocular and objective lenses in finished binoculars. If the optical distance exceeds 1 mm, the external helicoid 19 or bridge pin 18 is reset of modify the outermost position of the ocular lenses. It is easy to reset bridge pin 18, as follows: screws 16 are firstly loosened and cylindrical portion 15 is so turned as to retreat the external helicoid 19 along the internal helicoid 17 to a position in which the optical distance between the ocular and objective lenses is lengthened for compensation of tolerance in the finished binocular. Thereafter, the screws 16 are refastened to secure cylindrical portion 15 to flange 14. A significant advantage of this construction is that an optical distance between ocular and objective lenses is easily extensible without providing of a washer or the like on the bridge pin for compensation to tolerance in each finished binocular. The washer, if used for elongation of the optical distance, is difficult to be mounted on the bridge pin and gives somewhat awkward appearance to the binocular.

The knob 9 is formed with a threaded hole 26 in which a detent-ball 27 is contained. The dentent ball 27 is adjustably pressed on the periphery of hinge pin 4 through a coil spring 28 by a screw 29 for precaution of irregular rotation of knob 9. A cover plate 11 is fitted on knob 9 to prevent both connecting pin 10 and screw 26 from falling out of knob 9.

In focusing operation, knob 9 is turned about one-eighth rotation with a single stroke of the user's finger. Center shaft 12 with internal helicoid 17 is rotated together with knob 9 by connecting pin 10. Internal helicoid 17 is turned to cause external helicoid 19 on bridge pin 18 to move back and forth. Movement of bridge pin 18 is transmitted to ocularlens housings 22 which in turn imparts an axial movement to the coupled ocular lenses. Rapid short-stroke focusing is achieved by the spiral lead of the internal and external multiple helicoid 17, 19. In the case of the above-mentioned 7-power binocular, a knob rotation of about 45 degrees is sufficient to displace the ocular lenses axially 5 mm longer than 4 mm full focusing range. Backlash between the helicoids 17, 19 is negligibly small as compared with the conventional cam mechanism, so that the ocular movement is very smooth without accompanying shaky play.

Without the help of detent ball-27, the multiple helicoids 17, 19 can prevent ocular-lens housings 22 from being easily moved by such a thrust as produced when the ocular-lens housings 22 have their eyepieces touched on user's face. If it is needed to keep an adjusted focus more stable, screw 29 is adjusted to press detent-ball 27 through coil spring 28 onto the periphery of hinge pin 4. The detent-ball 27 makes a frictional contact with hinge pin 4 to restrain rotation of center shaft 12 integral with knob 9. Thus, the focus is kept steady, even if a thrust acting on bridge pin 18 exceeds the resistance by the multiple helicoids 17, 19.

There has been described a center-focus binocular which permits rapid and smooth focusing and supports adjusted focus stable by the help of novel multiple helicoid mechanism. The mechanism also allows easy modification of the ocular member relative to the objective member for compensation of tolerance in each finished binocular.

What is claimed is:

1. A rapid-focus binocular comprising both objective-lens housing rotatably connected with the intervention of a hinge pin, a pair of ocular-lens housings telescopically fitted in said respective objective-lens housings and rotatably connected with the intervention of a bridge pin, said hinge pin having in the periphery thereof a guide slot, said guide slot extending along a circle perpendicular to the axis of said hinge pin to form an arc with a center angle of less than 45 degrees, a knob rotatably mounted on said hinge pin, a center shaft rotatably inserted in said hinge pin and provided with a cylindrical portion, a connecting pin provided between said knob and said center shaft through said guide slot for integral rotation thereof, said bridge pin being formed with a non-rotating external multiple helicoid in mesh with an internal multiple helicoid formed on said cylindrical portion of said center shaft, said multiple helicoids having such a spiral lead that move said non-rotating external helicoid through a distance required for at least a full focusing range upon about a one-eighth rotation of said internal helicoid.

2. A rapid-focus binocular as claimed in claim 1, wherein said center shaft is formed with a flange peripherally grooved and axially projected from said hinge pin, said cylindrical portion of said center shaft being separately formed and removably secured to said flange.

3. A rapid-focus binocular as claimed in claim 2, wherein said cylindrical portion is angularly adjustably fixed to said flange by screws which are threadedly inserted from the periphery of said cylindrical portion to the peripheral groove in said flange.

4. A rapid-focus binocular as claimed in claim 3, wherein said bridge pin has the front pivot thereof guided in a center bore in said flange.

* * * * *